Sept. 20, 1938.  L. P. FOSNOT  2,130,583
PUMP LUBRICATOR
Filed Dec. 31, 1936
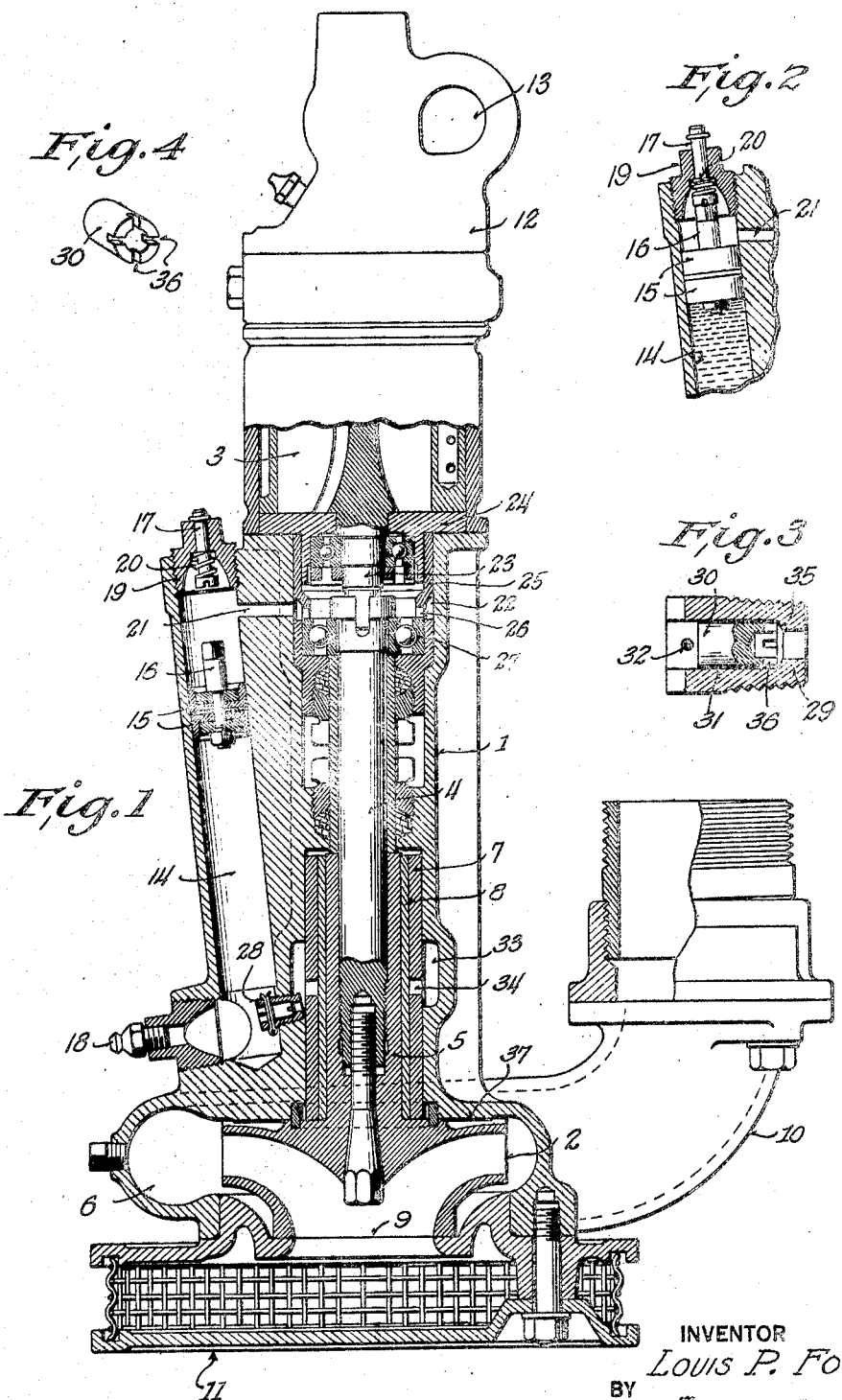
INVENTOR
LOUIS P. FOSNOT
BY
ATTORNEY Patented Sept. 20, 1938

2,130,583

UNITED STATES PATENT OFFICE 2,130,583

PUMP LUBRICATOR

Louis P. Fosnot, Aurora, Ill., assignor to Independent Pneumatic Tool Co., Chicago, Ill., a corporation of Delaware Application December 31, 1936, Serial No. 118,466

6 Claims. (Cl. 184—39)

This invention relates to portable power operated pumping units of the general character depicted in the R. A. Norling Patent No. 2,020,956, granted November 12, 1935.

Pumping units of this type are designed for outdoor and building work, and when in use are lowered into a pit, trench, basement or other chamber for pumping out the water or other liquid therefrom. These units must be sturdy and strong in construction to withstand the heavy duties imposed upon them in service, and are called upon to pump, not only clean water, but at times highly saturated solutions of silt and fine gravel.

As the pressure of the discharged material varies according to the head, an opportunity is afforded for a certain amount of the liquid passing through the pump to get into the bearing for the pump shaft at the lower end of the unit. This bearing must be kept well lubricated, and the practice, heretofore, has been to manually force a lubricating grease into the bearing from time to time through grease cups or pressure fittings secured to the shaft housing in the region of the bearing. Lubricating the bearing in this way is only momentary and the lubricant is soon dissipated by the liquid which flows through the bearing in the use of the pump. If the operator neglects the lubrication over an extended period, the bearing may suffer an entire loss of lubrication and in that state wear out prematurely fast. These pumps are usually set up in isolated places, not at all convenient for proper servicing, and due to lack of attention in keeping the bearing properly lubricated the bearings wear out relatively fast.

The general purpose and object of my invention is to provide the pumping unit with a lubricating device which acts during the running of the pump to automatically supply lubricant to the lower bearing to prevent premature wear thereof and thus prolong the life of the pump.

Another object of my invention is to provide the lubricating device as an integral part of the pumping unit so that it can not be damaged or destroyed, and moreover hold a supply of lubricant sufficient to last for an extended period without refilling or attention.

Another object of my invention is to utilize the pressure fluid employed to run the pump to force the lubricant to the bearing, and thus conserve the lubricant supply by forcing lubricant to the bearing only during the running of the pump.

A further object of my invention is to provide the pumping unit with a reservoir to hold the lubricant supply.

A further object of my invention is to provide the reservoir with a signal which will indicate when the reservoir is completely filled with lubricant. The advantage of this is that lubricant can not be wasted by overfilling the reservoir or the reservoir walls broken through by excess pressure during a filling operation.

A further object of my invention is to provide a metering device for controlling the flow of lubricant from the reservoir to the bearing, and thus conserve the lubricant supply by regulating the amount of lubricant which may be forced to the bearing.

Other and further objects of my invention will appear from the following specification, taken in conjunction with the accompanying drawing, in which—

Fig. 1 shows a pumping unit provided with a lubricating device in accordance with my invention, the showing being partly in elevation and partly in longitudinal section for the purpose of illustration;

Fig. 2 is a vertical sectional view through the upper end of the reservoir showing the signal device raised to indicate that the reservoir is completely filled with lubricant;

Fig. 3 is an axial sectional view of the metering device to be hereinafter more fully described; and Fig. 4 is a perspective view of the inner plug of the metering device.

As shown in the drawing, the pumping unit comprises a pump housing 1 having a centrifugal pump device 2 at its lower end and a pneumatically operated motor 3 at its upper end. The housing 1 contains a shaft 4 connecting the pump device 2 to the motor 3. The pump device has a hub 5 which extends into the lower end of the housing 1 about the shaft 4 and is connected thereto in the manner shown in Fig. 1. The lower end of the housing 1 opens into the pump chamber 6 and is fitted with one or more bushings 7, 8 which surround the hub 5 and provide a plain bearing of considerable length for the lower end of the shaft element as constituted by the connected shaft and hub-sections as shown. The pump device 2 extends over the bushings and holds them in place in the housing.

The pump device 2, which comprises a centrifugal impeller, draws in liquid at its center opening 9 and discharges the liquid at its periphery into the pump chamber 6. The latter has an upwardly directed discharge outlet 10 to which the discharge pipe or hose (not shown) used with the pumping unit is connected for conveying the liquid out of the trench or chamber in which the pumping unit is operated. The opening 9 is on the under side of the pump device and is guarded by a screen fixture 11 as shown. A non-return check valve (not shown) may be provided on the discharge side of the pump to prevent a reverse flow of liquid therethrough.

Compressed air is supplied to the motor 3 for operating it through a valve section 12 at the upper end of the pumping unit. This section is bolted or otherwise rigidly secured to the motor section and contains the air inlet for the motor and the controlling valve therefor as depicted in the Norling patent aforesaid. The motor section is also secured to the housing, the parts being in axial alinement as shown, so that the device is a self contained pumping unit. The valve section 12 has an eye 13 to facilitate lowering and raising the unit into and out of a trench or other place of use.

The lubricating device of my invention comprises a reservoir chamber 14 attached to or formed integral with the pump housing 1 and extending along the same as shown in Fig. 1. This chamber is preferably drilled and reamed to the desired dimensions in a projection cast integral with the housing at one side thereof. As shown, the chamber 14 extends from the lower to the upper end of the housing or approximately so, and has a dimension to hold a considerable supply of lubricant. In the particular embodiment shown, the chamber has a size to hold lubricant for substantially twenty-four hours of continuous running of the pump.

Slidably mounted in the chamber 14 are a pair of leather piston members 15, 15 fixed to a stem 16. The latter projects above the piston assembly and serves to raise an indicator rod or pin 17 when the chamber 14 is filled with lubricant as shown in Fig. 2. The lubricant, which is preferably grease, is forced into the chamber 14 under pressure through a grease nipple or like fixture 18 at the lower end of the chamber. The incoming lubricant raises the pistons 15 which lift the rod 17 to indicate to the operator that the chamber 14 has been filled with its supply of lubricant.

The rod 17 is slidably mounted in the closure plug 19 at the upper end of the chamber 14 and extend into the chamber in line with the piston stem 16 for contact therewith. The rod 17 is pressed inwardly by a coiled spring 20 which normally holds the rod in its retracted position within the chamber 14 when the piston stem is moved out of contact therewith as the lubricant level in the chamber decreases in the running of the pump. This position of the rod is shown in Fig. 1. Thus the rod is reset as the lubricant level decreases and is in position to be raised when the chamber 14 is again filled with lubricant.

Pressure fluid from the motor is employed to continuously force lubricant from the chamber 14 to the bearing, as constituted by the bushings 7 and 8, during the running of the pump. This, in the embodiment shown, is accomplished by connecting the upper end of the reservoir chamber 14 above the pistons 15 with the motor by a passage 21 in the pump housing 1. This passage leads to a recess 22 at the upper end of the housing 1 and into which recess the motor shaft 23 extends for connection with the pump shaft 4 as shown in Fig. 1. The end plate 24 of the motor 3 extends over the recess 22. A certain amount of the pressure fluid escapes from the motor into the recess 22 between the end plate and the shaft end 23 and enters the reservoir chamber 14 through the passage 21. By this arrangement a direct connection with the pressure supply is unnecessary, and exteriorly disposed conduit means which might be broken or damaged in the rough handling of the pump unit is avoided. Moreover, by the use of leakage pressure, rather than direct pressure, a larger conveying passage can be employed to avoid possible clogging and no control valve is required to turn the lubricator on and off in the starting and stopping of the pump.

The bearing spacer 25 in the recess 22 is provided with openings 26 so that the escaping pressure fluid may readily reach the passage 21. The spacer 25 is for the ball-bearing 27 for the upper end of the pump shaft 4 as shown. The motor illustrated is of the rotor type having piston blades operable in slots in the rotor, as in devices of this character.

The reservoir chamber 14 is connected at its lower end with the bushings 7, 8 through a metering device 28 which regulates or controls the amount of lubricant flowing to the lower bearing.

The metering device, as detailed in Fig. 3, comprises a tubular member or hollow plug 29 screwed into the wall of the chamber 14 opposite the bushings 7, 8. The plug 29 is reamed out to a certain size and receives an auxiliary plug 30 of a dimension about .002 of an inch smaller in diameter to provide a passage 31 between the inner and the outer plugs as indicated in Fig. 3. This figure is exaggerated to illustrate the construction. The inner plug 30 is solid or closed and is held in place in the housing 29 by a cotter pin 32. The lubricant must pass the clearance between the two surfaces and the length and diameter control the flow of lubricant to the bearing.

The outer end of the outer plug 29 opens into the reservoir chamber 14, while its inner end opens into a chamber 33 about the bushings 7, 8. The outer bushing 7 is provided with ports 34 so that lubricant may reach the inner bushings. The inner plug 30 is forced against a seat 35 within the outer plug by the pressure on the lubricant in the reservoir 14. This end of the inner plug is made hollow and is slotted, as at 36, 36 so that lubricant may be forced through the metering device to the bushings 7 and 8.

With the housing 1 opening into the pump chamber 6, it is obvious that the liquid handled by the pump device may reach the bushings 7, 8 through the labyrinth 37 between the housing 1 and the impeller 2. But with the bushings 7, 8, that is the bearing, continuously flushed with lubricant during the running of the pump any liquid finding its way into the bearing even though silt or gravel laden will not prematurely damage the bearing. Thus, the pump will be properly lubricated.

It is important to note, that in accordance with my invention, the lubricating device operates only when the pump is in operation. This conserves the lubricant supply and makes it last longer, as there is no feeding of the lubricant to the bearing when the pump is not in use. It is also important to note that the metering device conserves the lubricant supply, in that only the proper amount of lubricant can be fed to the bearing during the running of the pump. Another feature of advantage is that spent or live air from the motor is used to force the lubricant from the reservoir 14, thus relieving the lubricant supply of pressure when the pump is not in operation.

With the indicator rod 17, overfilling of the reservoir 14 with lubricant is guarded against, and wasting of the lubricant by forcing it into the bearing or past the pistons 15 or breaking the wall of the reservoir casing by excess pressure is avoided. The rod 17 will indicate when the reservoir is completely full of lubricant. The reservoir is filled through the pressure nipple 18, thus allowing the reservoir to be easily and readily filled without removing the cap 19 or the pistons 15.

With the reservoir 14 an integral part of the pumping unit, the latter is provided with means for carrying its lubricant supply, and the parts cannot be accidentally damaged or destroyed. Moreover, the construction affords a lubricant supply for an extended period, the design shown herein providing oiling service for at least twenty-four hours continuous running.

The invention disclosed is particularly designed for a lubricating grease, but any lubricant, such as oil, is, within the contemplation of my invention.

The details of construction and arrangement of parts shown and described may be variously changed and modified without departing from the spirit and scope of my invention, except as pointed out in the annexed claims.

I claim as my invention:

1. A lubricator for a pressure fluid operated mechanism wherein is provided a pressure fluid actuated motor, a rotary member driven by said motor, a hollow casing supporting said member and motor, and a bearing for said member in said casing, said motor being supported by said casing in a manner permitting pressure fluid leakage into the casing from the motor, said lubricator comprising a lubricant containing reservoir carried by the casing, said reservoir having a discharge port for lubricant connected to the bearing and an inlet port for pressure fluid leakage connected to the casing, said inlet port conveying pressure fluid leakage from the casing to the reservoir for forcing lubricant from the reservoir to the bearing during the operation of the motor.

2. A lubricator for a pressure fluid operated mechanism wherein is provided a pressure fluid actuated motor, a rotary member driven by said motor, a hollow casing supporting said member and motor, a bearing for said member in said casing, said motor being supported by said casing in a manner permitting pressure fluid leakage into the casing from the motor, said lubricator comprising a lubricant containing reservoir carried by the casing, a reciprocal piston in the reservoir above the supply of lubricant therein, said reservoir having inlet and discharge ports, the discharge port being below the piston and connected to the bearing and the inlet port being above the piston and connected to the casing, said inlet port conveying pressure fluid leakage from the casing to the reservoir above the piston for forcing the lubricant thereby from the reservoir to the bearing during the operation of the motor, a lubricant filling passage in the reservoir below the piston, and means actuated by the piston to indicate when the reservoir is filled with its supply of lubricant.

3. A lubricator for a pressure fluid operated mechanism wherein is provided a pressure fluid actuated motor, a rotary member driven by said motor, a hollow casing supporting said member and motor, a bearing for said member in said casing, said motor being supported by said casing in a manner permitting pressure fluid leakage into the casing from the motor, said lubricator comprising a lubricant containing reservoir carried by the casing, a reciprocal piston in the reservoir above the supply of lubricant therein, said reservoir having inlet and discharge ports, the discharge port being below the piston and connected to the bearing and the inlet port being above the piston and connected to the casing, said inlet port conveying pressure fluid leakage from the casing to the reservoir above the piston for forcing lubricant thereby from the reservoir to the bearing during the operation of the motor, a lubricant filling passage in the reservoir below the piston, and a rod raisable by the piston on filling the reservoir to indicate when the reservoir is filled with its supply of lubricant.

4. A lubricator for a portable pumping unit wherein is provided a pressure fluid actuated motor at the upper end of the unit and a centrifugal pump device at the lower end of the unit and having a rotary impeller driven by said motor, a hollow casing between and supporting the pump device and motor, and a bearing for the impeller in the lower end of said casing and reachable by the liquid passing through the pump, said motor being supported by the casing in a manner permitting pressure fluid leakage into the upper end of the casing, said lubricator comprising a lubricant containing reservoir carried by the casing between the pump device and motor, said reservoir having inlet and discharge ports, the discharge port connecting the lower portion of the reservoir to the bearing and the inlet port connecting the upper end of the reservoir to the casing, said inlet port conveying pressure fluid leakage from the casing to the reservoir for forcing lubricant from the reservoir to the bearing during the operation of the pump.

5. A lubricator for a portable pumping unit wherein is provided a pressure fluid actuated rotary motor at the upper end of the unit and a centrifugal pump device at the lower end of the unit and having a rotary impeller, a hollow casing between and supporting the pump device and motor, a shaft element in the casing connecting the impeller to the motor for rotation thereby, a bearing for the impeller in the lower end of the casing and accessible to the liquid flowing through the pump, the connection between the shaft element and the motor being at the upper end of the casing and permitting the escape of pressure fluid from the motor into the casing, said lubricator comprising a lubricant containing reservoir carried by the casing between the pump device and motor, a reciprocal piston in said reservoir above the supply of lubricant therein, said reservoir having inlet and discharge ports, the discharge port being below the piston and connected to the bearing and the inlet port being above the piston and connected to the upper end of the casing, said inlet port conveying pressure fluid leakage from the casing to the reservoir above the piston for forcing the lubricant thereby from the reservoir to the bearing during the operation of the pump.

6. A lubricator for a portable pumping unit wherein is provided a pressure fluid actuated motor at the upper end of the unit and a pump device at the lower end of the unit and having a rotary impeller driven by the motor, a hollow casing between and supporting the pump device and motor, and a bearing for the impeller in the lower portion of said casing and accessible to the liquid passing through the pump, said motor being supported by the casing in a manner permitting pressure fluid leakage into the upper end of the casing, said lubricator comprising a lubricant containing reservoir carried by the casing on the outer side thereof and extending from adjacent the pump device to adjacent the motor, said reservoir having inlet and discharge ports, the discharge port connecting the lower end of the reservoir to the bearing and the inlet port connecting the upper end of the reservoir to the casing, said inlet port conveying pressure fluid leakage from the casing to the reservoir for forcing lubricant from the reservoir to the bearing during the operation of the pump, and a metering valve at the discharge port to control the supply of lubricant to the bearing.

LOUIS P. FOSNOT.